United States Patent
Edwards et al.

(10) Patent No.: US 7,243,343 B2
(45) Date of Patent: Jul. 10, 2007

(54) METHOD, COMPILER AND PLATFORM INDEPENDENT FRAMEWORK FOR PARSING AND GENERATING DATA STRUCTURES

(75) Inventors: Joseph R. Edwards, Rochester, MN (US); Robert John Manulik, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 09/829,834

(22) Filed: Apr. 10, 2001

(65) Prior Publication Data
US 2004/0019874 A1    Jan. 29, 2004

(51) Int. Cl.
G06F 9/45    (2006.01)
H04L 12/56    (2006.01)

(52) U.S. Cl. .................. 717/143; 717/106; 370/395.3

(58) Field of Classification Search ................ 717/106, 717/147; 707/101; 370/395.1–395.6, 399
See application file for complete search history.

(56) References Cited

U.S. PATENT DOCUMENTS 5,870,749 A * 2/1999 Adusumilli ................. 707/101
6,028,863 A * 2/2000 Sasagawa et al. .......... 370/399

* cited by examiner

*Primary Examiner*—Meng-Al T An
*Assistant Examiner*—Trenton J. Roche
(74) *Attorney, Agent, or Firm*—Joan Pennington (57) ABSTRACT

A method, compiler and platform independent framework are provided for parsing and generating data structures. Size of and offsetof functions are utilized for defining a length and a location of each parameter of a data structure. The length and location of each parameter of the data structure are stored within an identifier object in a data structure definition. The identifier structure is based on the definition of the data structure itself so that the problem of duplicating the data structure definition is eliminated. The sizeof and offsetof functions automatically account for compiler and platform differences which otherwise would lead to alignment problems so that compiler and platform independence from data structure realignment is provided.

14 Claims, 13 Drawing Sheets

CONNECTION IDENTIFIER INFORMATION ELEMENT (IE) 200

| Connection Identifier | | | | | | | |
|---|---|---|---|---|---|---|---|
| 0 | 1 | 0 | 1 | 1 | 0 | 1 | 0 | information element identifier = 0X5A

| 1 ext | Coding standard | IE Instruction Field |
|---|---|---|

| Length of Connection Identifier contents |
|---|
| Length of Connection Identifier contents (cont.) |

| 1 ext | spare 0  0 | VPassociated signaling 0  1 | preferred exclusive |
|---|---|---|---|

| VPCI |
|---|
| VPCI (cont.) |
| VCI |
| VCI (cont.) |

FIG. 2B

AtmSvcConnIdle Rules 202

```
Information element identifier = 0x5A;
pointer to 1st data rule =
    grp 5: an Extension bit Group 204
        initialize byte to 0x08;
        pointer to 1st data rule =
            prefExclConnIdleParm_; sub byte data
                mask defining location within byte = 0x07;
                allowed values = {0x00, 0x01, 0x04;
                length and offset of prefd_exclus within conn_id_struct
                pointer to next data rule = NULL;
        pointer to next group rule =
    grp 6: a fixed length group 206
        pointer to 1st data rule =
            vpciConnIdleParm_ : two byte data
                allowed range of values = 0 → 255
                length and offset of vpci within conn_id_struct
                pointer to next data rule = NULL;
        pointer to next group rule =
    grp 7: a fixed length group 208
        pointer to 1st data rule =
            vciConnIdleParm_ : two byte data
                allowed range of values = 32 → 65535
                length and offset of vci within conn_id_struct
                pointer to next data rule = NULL;
        pointer to next group rule = NULL;
```

|   | 0 | 1 | 2 | 3 |
|---|---|---|---|---|
| 0 | prefd_exclus | vpci | | vci |
| 1 | vci | | | |

| structure field 402 | sizeof() 404 | offsetof() 406 |
|---|---|---|
| prefd_exclus | 1 | 0 |
| vpci | 2 | 1 |
| vci | 2 | 3 |

|   | 0 | 1 | 2 | 3 |
|---|---|---|---|---|
| 0 | prefd_exclus | x | vpci | |
| 1 | vci | | x | x |

| structure field 602 | sizeof() 604 | offsetof() 606 |
|---|---|---|
| prefd_exclus | 1 | 0 |
| vpci | 2 | 2 |
| vci | 2 | 4 |

|   | 0 | 1 | 2 | 3 |
|---|---|---|---|---|
| 0 | prefd_exclus | x | x | x |
| 1 | vpci |   | x | x |
| 2 | vci |   | x | x |

| structure field 802 | sizeof() 804 | offsetof() 806 |
|---|---|---|
| prefd_exclus | 1 | 0 |
| vpci | 2 | 4 |
| vci | 2 | 8 |

SOURCE CODE 900

```
struct conn_id_struct
{
    void*       next;
    char        prefd_exclus;
    short int   vpci;
    short int   vci;
};
```

|   | 0 | 1 | 2 | 3 |
|---|---|---|---|---|
| 0 | next | | | |
| 1 | prefd_exclus | x | vpci | |
| 2 | vci | | x | x |

| structure field 1102 | sizeof() 1104 | offsetof() 1106 |
|---|---|---|
| next | 4 | 0 |
| prefd_exclus | 1 | 4 |
| vpci | 2 | 6 |
| vci | 2 | 8 |

| structure field 1302 | sizeof() 1304 | offsetof() 1306 |
|---|---|---|
| next | 8 | 0 |
| prefd_exclus | 1 | 8 |
| vpci | 2 | 10 |
| vci | 2 | 12 |

METHOD, COMPILER AND PLATFORM INDEPENDENT FRAMEWORK FOR PARSING AND GENERATING DATA STRUCTURES

FIELD OF THE INVENTION

The present invention relates generally to the data processing field, and more particularly, relates to a method, compiler and platform independent framework for parsing and generating data structures.

DESCRIPTION OF THE RELATED ART

One common use of procedural tables or object oriented rules is for parsing and generating of protocol data units (PDUs) in data communication messages. In these cases the data can be thought of purely as strings of bytes. Normally, the layer of network software that is generating or parsing these PDUs is receiving or sourcing application programming interface (API) commands from another software layer. These API commands consist of data structures containing data entities from which the PDU will be built for the case of generating the PDU or else derived from the PDU for the case of parsing the PDU.

Often the network layer of software does no real processing of these data entities other than perhaps validity checking or simple translation. One can consider that this role of the network layer is that of translating data structures at the user interface to strings of bytes at the network interface. It is natural to attempt to further simplify this framework by considering the data structures themselves to be strings of bytes. This would make it possible for the methods used to parse and generate PDUs to be reused or extended to parsing and generating the data structures.

However, the process of coding a table or equivalently, a rule object to define the data structure is redundant with the data structure's definition. Additionally, treating a data structure as a string of bytes can lead to problems with alignment within the structure changes for reasons such as using a different compiler or targeting the code for a 64-bit processor instead of a 32-bit processor.

A need exists for an improved method, compiler and platform independent framework for parsing and generating data structures.

SUMMARY OF THE INVENTION

A principal object of the present invention is to provide a method, compiler and platform independent framework for parsing and generating data structures. Other important objects of the present invention are to provide such method, compiler and platform independent framework for parsing and generating data structures substantially without negative effect and that overcome many of the disadvantages of prior art arrangements.

In brief, a method, compiler and platform independent framework are provided for parsing and generating data structures. Sizeof and offsetof functions are utilized for defining a length and a location of each parameter of a data structure. The length and location of each parameter of the data structure are stored within an identifier object in a data structure definition.

In accordance with features of the invention, the identifier structure is based on the definition of the data structure itself so that the problem of duplicating the data structure definition is eliminated. The sizeof and offsetof functions automatically account for compiler and platform differences which otherwise would lead to alignment problems so that compiler and platform independence from data structure realignment is provided.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
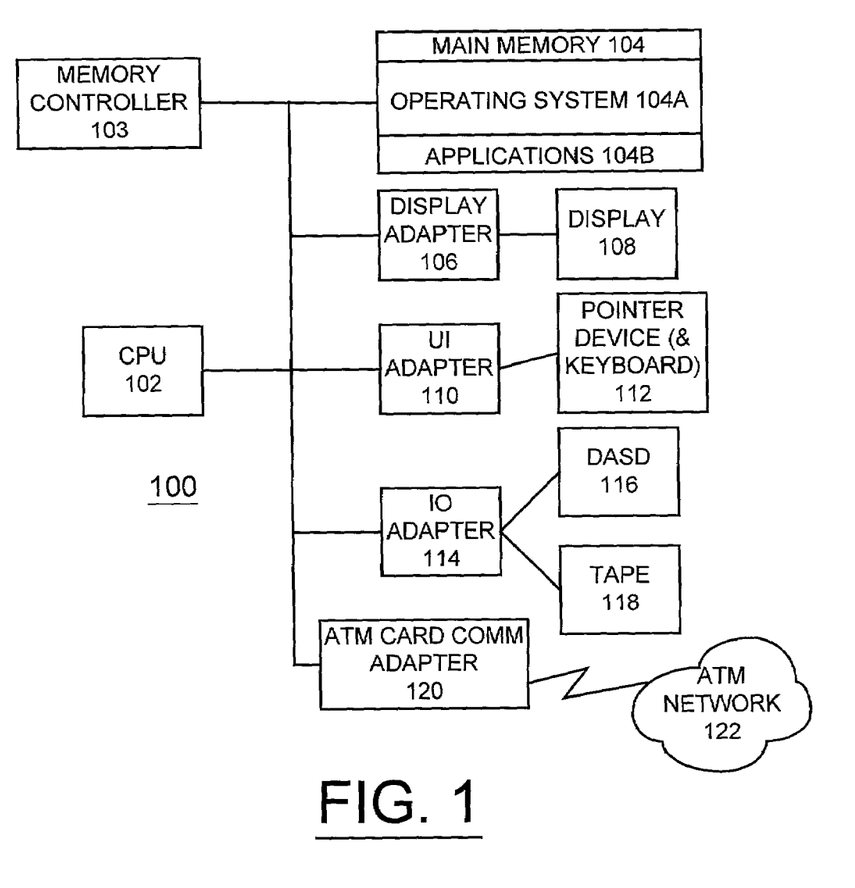
FIG. 1 is a block diagram representation illustrating a computer system for implementing methods for parsing and generating data structures in accordance with the preferred embodiment.

Having reference now to the drawings, in FIG. 1, there is shown a computer or data processing system generally designated by the reference character 100 for carrying out the methods for parsing and generating data structures of the preferred embodiment. As shown in FIG. 1, computer system 100 includes a central processor unit (CPU) 102 connected by a system bus to a memory controller 103, a main memory 104 including an operating system 104A and applications 104B, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected via an Asynchronous Transfer Mode (ATM) card communications adapter 120 to an ATM network 122. It should be understood that the present invention is not limited to a computer model with a single CPU, or other single component architectures as shown in FIG. 1.

Figure 12:
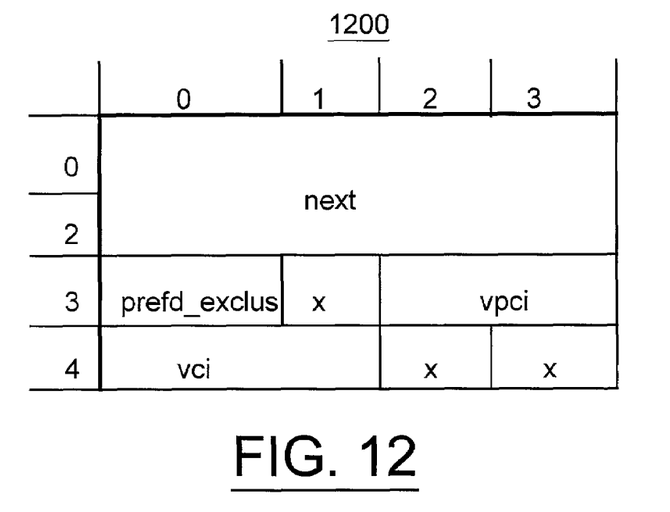
FIG. 12 is a diagram illustrating a memory view of a compiler generating aligned data structures for 64-bit CPU architecture in accordance with the preferred embodiment.
Figure 13:
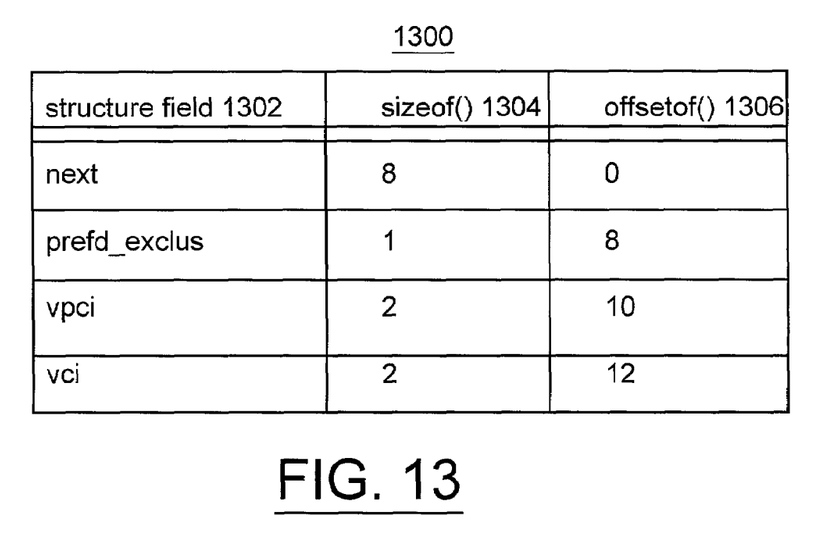
FIG. 13 is a diagram illustrating information to manipulate the data generated by the compiler for the aligned data structures of FIG. 12 in accordance with the preferred embodiment.
Figure 14A:
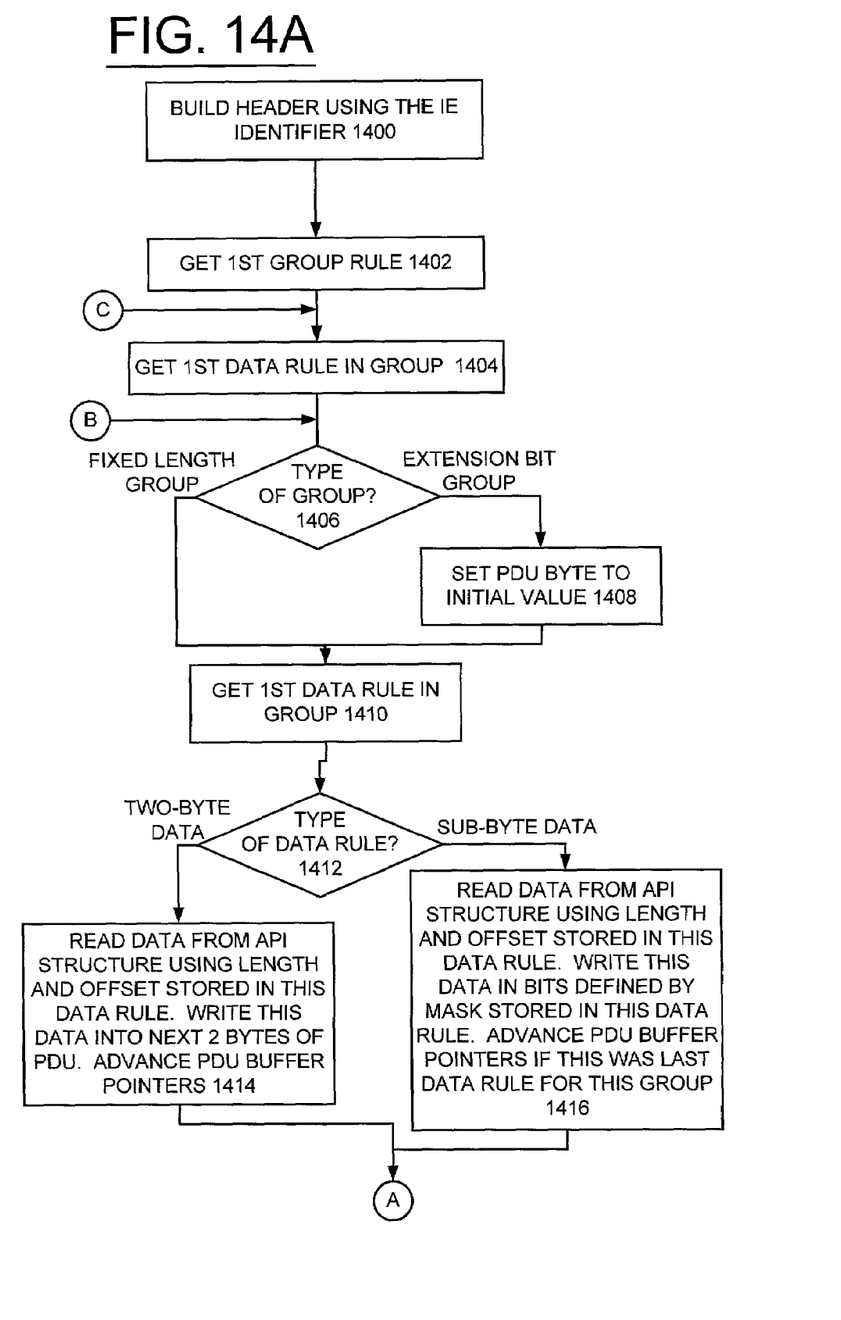
FIGS. 14A and 14B are flow charts illustrating sequential steps for build of a PDU connection identifier directly from API data structure in accordance with the preferred embodiment.
Figure 14B:
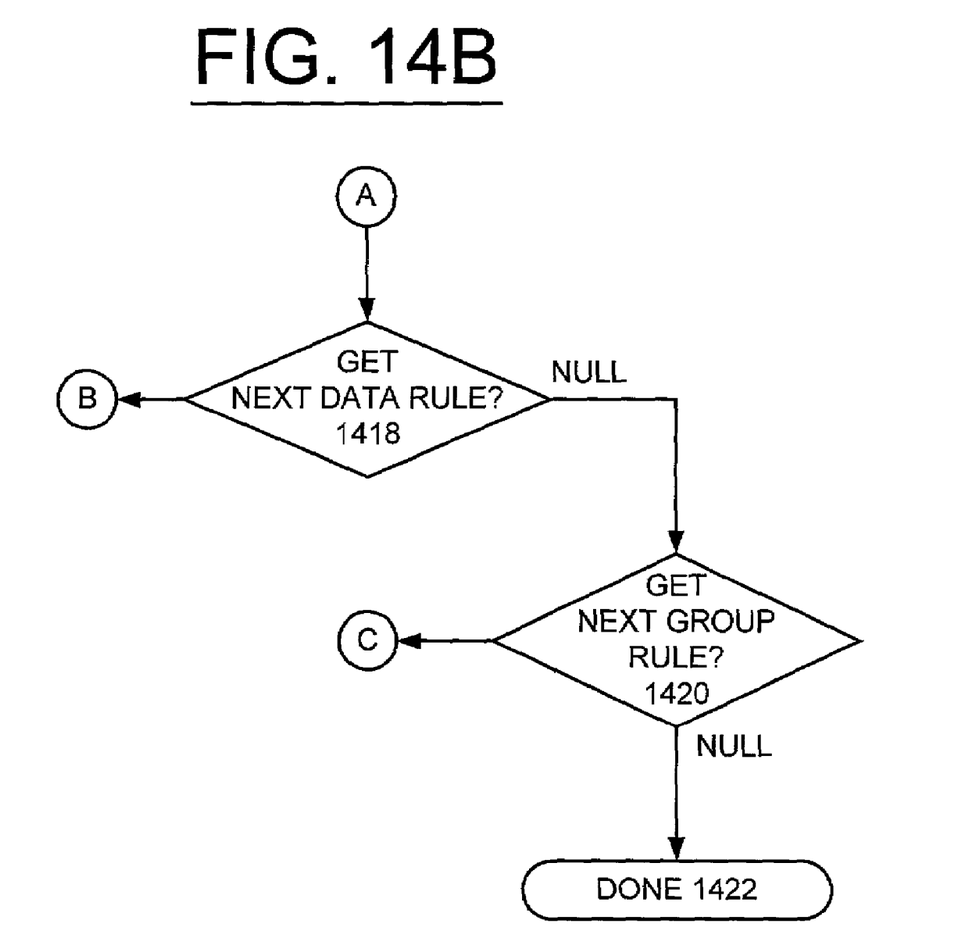

Central processor unit 102 is suitably programmed for generating data structures and information to manipulate the data, such as illustrated and described with respect to FIGS. 3–8 and 10–13 and to execute the flowchart of FIGS. 14A and 14B. Computer 100 may be implemented using any suitable computer, such as an IBM personal computer running the OS/2® operating system.

In accordance with features of the preferred embodiment, a method is provided that can be used by procedural table-driven or object oriented rules-driven approaches for generating and parsing data structures. A pair of functions, sizeof( ) and offsetof( ) functions are used. The sizeof( ) and offsetof( ) functions are built into the C and C++ programming languages. It should be understood that other languages have sizeof( ) and offsetof( ) functions or these functions can be built within the constraints of other languages. In accordance with features of the preferred embodiment, instead of implementing a table or rule object as a redundant definition of the data structure, the length and location of each of the data structure's parameters are defined within the table or rule object by the sizeof( ) and offsetof( ) functions. Thus, the table or rule object is based on the definition of the data structure itself. This differs from treating the data structure purely as a string of bytes in that the offsetof( ) function provides the location of each parameter within the structure whereas a purely string implementation would only deal with the length of each parameter. Additionally, the sizeof( ) and offsetof( ) functions automatically account for compiler and platform differences which otherwise would lead to alignment problems. Since the sizeof( ) and offsetof( ) functions execute at compile time, no performance penalty results.

Figure 2A:
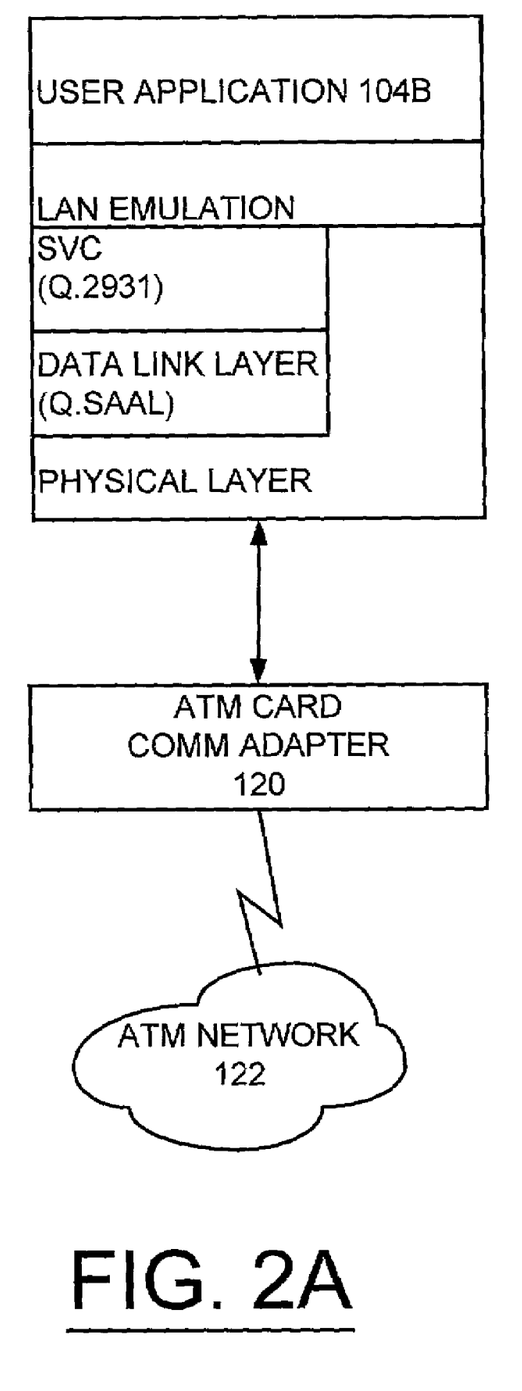
FIG. 2A is a block diagram representation illustrating in more detail software components of a user's application to utilize the Asynchronous Transfer Mode (ATM) network communications adapter in the computer system of FIG. 1 in accordance with the preferred embodiment.

FIG. 2A illustrates in more detail software components of a user application 104B to utilize the ATM card communications adapter 120 in the computer system 100 in accordance with the preferred embodiment. User application 104B is used with a LAN emulation layer, an SVC (Q.2931), a data link layer (Q.SAAL), and a physical layer. User application 104B of the preferred embodiment is the call control layer for the ATM SVC (Q.2931). This protocol consists of a number of messages, SETUP, CALL PROCEEDING, CONNECT, RELEASE, and the like, to establish and clear switched virtual calls. Each of these messages is comprised of a number of Information Elements (IEs). There are dozens of different IEs defined by the Q.2931 standard and each ID contains from a few to many, for example, up to 20 separate data parameters. The user interface to the call control layer contains a similar degree of complexity and the same number of data parameters. The magnitude of individual data parameters which need to be handled at both the user and network interfaces make this ATM call control layer a prime candidate for a table-based or rule object-based implementation.

Figure 2B:
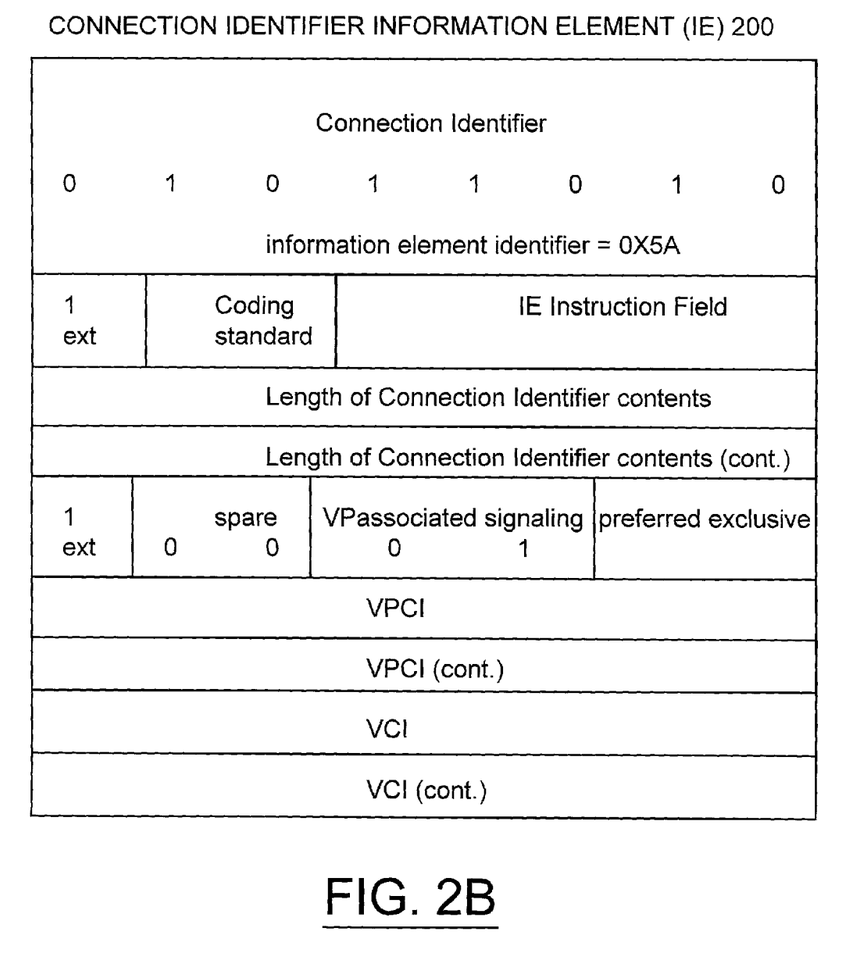
FIG. 2B is a diagram illustrating a connection identifier information element (IE) in accordance with the preferred embodiment.
Figure 2C:
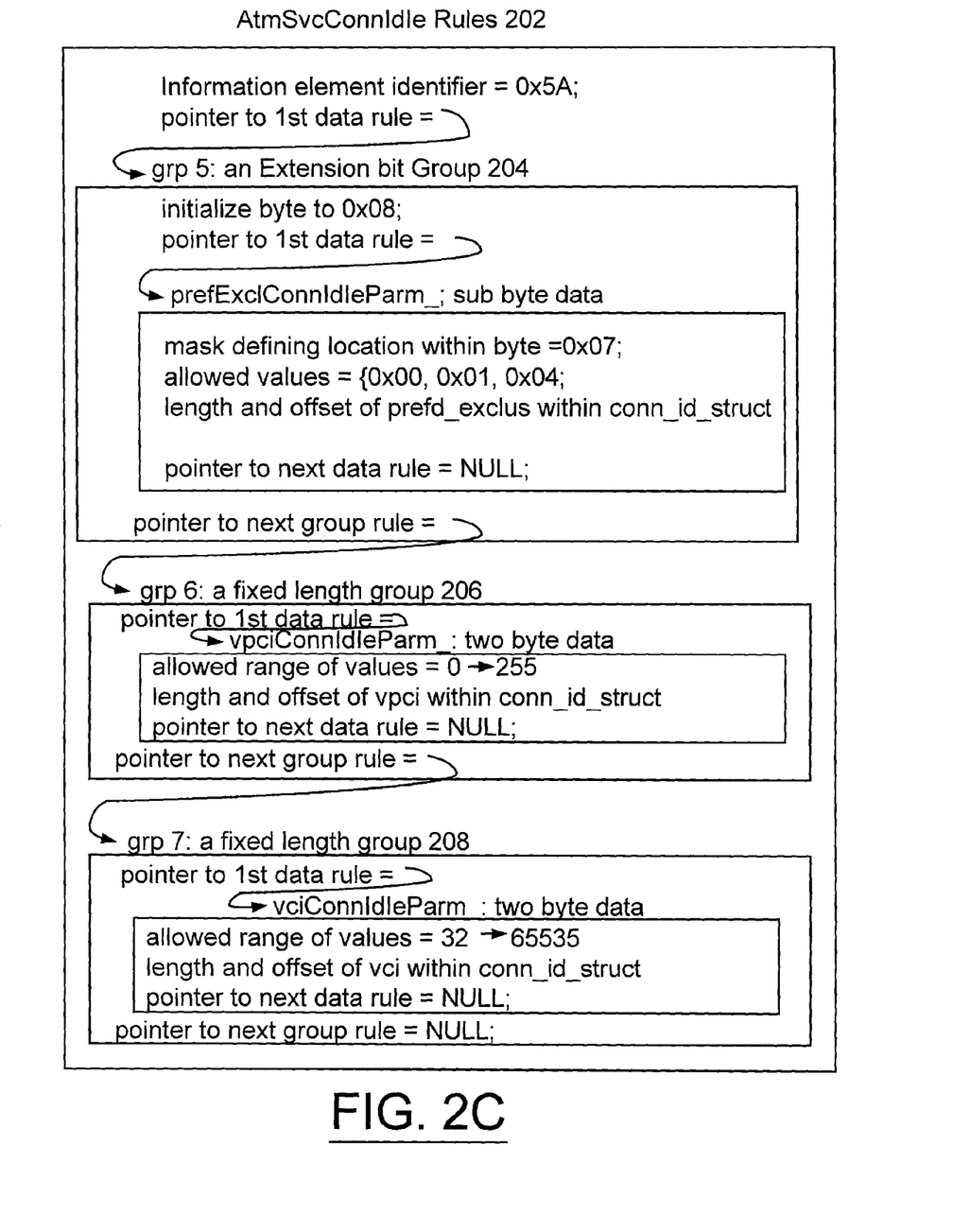
FIG. 2C is a block diagram illustrating AtmSvcConnIdleRules for parsing and generating data structures in accordance with the preferred embodiment.

FIGS. 2B and 2C respectively illustrate a Connection Identifier Information Element (IE) generally designated by the reference character 200 and AtmSvcConnIdleRules generally designated by the reference character 202 for parsing and generating data structures in accordance with the preferred embodiment. An object oriented rules approach is applied to parsing and generating the network-side IE and then the object oriented rule is extended to additionally parse and generate the user-side data structure. AtmSvcConnIdleRules 202 illustrate the method for parsing and generating data structures of the preferred embodiment is applied to one IE. The Connection Identifier IE 200 begins with a 4-byte header whose format is generic to all IEs. The next byte contains a 2-bit constant, VP Associated Signaling and a 3-bit parameter, Preferred/Exclusive. The next two bytes comprise the Virtual Path Connection Identifier (VPCI) parameter. The final two bytes comprise the Virtual Channel Identifier (VCI) parameter. The network layer software also passes these parameters across the user-side API. FIG. 2B illustrates the format and content of the Connection Identifier IE 200.

The following rule object for the Connection Identifier IE 200 and its corresponding constructor contain all of the information unique to this IE and thus is all of the code unique to parsing and formatting it.

```
Class AtmSvcConnIdleRule: public AtmSvcleRule
{
public:
    AtmSvcConnIdleRules( ):       // Constructor for this class
protected:                         // protected member data
    // The following three data members represent the data parameters
    // passed between the network and the user of the ATM SVC layer.
    //
    // The first of these is of the SubByteData class. SubByteData
    // is a class which contains methods (parse, format, read from
    // memory, write to memory) for dealing with
    data in IEs which is less
    // than one byte long. There may be more than one of these data
    // entities contained within a single byte. (See grp 5: an Extension bit
    // Group 204 in FIG. 2C.)
    //
    // The last two data parameters are of the TwoByteData class.
    // TwoByteData is a class which contains methods (parse, format,
    // read from memory, write to memory) for dealing with data in IEs
    // which is exactly two bytes long. (See grp 6: a fixed length group
    // 206 and grp 7 a fixed length group 208 in FIG. 2C.)
    SubByteData prefExclConnIdlePram__;
    TwoByteData vpciConnIdlePram__;
    TwoByteData vciConnIdlePram__;
private:
    enum {ield = CONNID_IE_ID }
    // 0X5A = value of the IE identifier
};
AtmSvcConnIdleRules: : AtmSvcConnIdleRules( )
```

-continued

```
AtmSvcleRule(ield)
{
    // The byte in this IE immediately following the 5 bytes of header, is
    // in the format known as an extension bit group. In this case,
    // the data is a mandatory field in the IE.
    static      ExtBitGroup grp5 //(204 in FIG. 2C, this
                                    MANDATORY_FLD,
                    0x08); // initialize the byte to OX08;
    // the 3-bit preferred/exclusive parameter is contained in this
    // extension bit group.
    prefExclConnIdleParm_.Init (this
                    0x07); // mask defining location
    // Define the 3 allowed values for preferred/exclusive
    static CheckSpecificValues      prefExcl ValidityCheck (this);
    prefExclValidityCheck.DefineCodePoint (0x00);
    prefExclValidityCheck.DefineCodePoint (0x01);
    prefExclValidityCheck.DefineCodePoint (0x04);
    // The next defined bytes in the IE is the two byte VPCI parameter.
    // This is defined to be a fixed length group
    static FixedLenGroup grp6 //(206 in FIG. 2C, this
                                    MANDATORY_FLD,
    vpciConnIdleParm_.Init (this);
    // Define the range of valid values for the VPCI
    static CheckRangeOfVals     vpciValidityCheck (this);
    vpciValidityCheck.DefineMinValue (0);
    vpciValidityCheck.DefineMaxValue (255);
    // The last two bytes in the Connection Id IE is the two byte VCI
    // parameter.
    static FixedLenGroup grp7 //(208 in FIG. 2C, this
                                    MANDATORY_FLD,
    vciConnIdleParm_.Init (this);
    // Define the range of valid values for the VCI
    static CheckRangeOfVals     vciValidityCheck (this);
    vpciValidityCheck.DefineMinValue (32);
    vpciValidityCheck.DefineMaxValue (65535);
```

The following structure is used by the user-side API and contains the three data parameters associated with the Connection Identifier IE 200.

```
        struct      conn_id_struct
        {
                uint8   prefd_exclus;
                uint16  vpci;
                uint16  vci;
        }
```

The following change to the constructor for the AtmSvcConnIdleRules object makes use of the method of the preferred embodiment and therby enhances this rule object so that it describes the Connection Identifier information on both the network side and the user side.

```
AtmSvcConnIdleRules: : AtmSvcConnIdleRules( )
:AtmSvcleRule(ield)
{
    conn_id_struct      connidUserStruct; // temporary variable needed
                                // for the sizeof function;
    // The byte in this IE immediately following the 5 bytes of header, is
    // in the format known as an extension bit group. In this case,
    // the data is a mandatory field in the IE.
    static      ExtBitGroup grp5 //(204 in FIG. 2C, this
                                    MANDATORY_FLD,
                    0x08); // initialize the byte to OX08;
    // the 3-bit preferred/exclusive parameter is contained in this
    // extension bit group.
    prefExclConnIdleParm_.Init (this
                    0x07); // mask defining location
    // Store the location and length preferred/exclusive parameter
```

-continued

```
    // relative to the conn_id_struct into the prefExclConnIdleParm_
    // object.
    prefExclConnIdleParm_
            .InitUserStructInfo ( offsetof(conn_id_struct, prefd_exclus ),
                        sizeof(connidUserStruct.prefd_exclus ) );
    // Define the 3 allowed values for preferred/exclusive
    static CheckSpecificValues      prefExclValidityCheck (this);
    prefExclValidityCheck.DefineCodePoint (0x00);
    prefExclValidityCheck.DefineCodePoint (0x01);
    prefExclValidityCheck.DefineCodePoint (0x04);
    // The next defined bytes in the IE is the two byte VPCI parameter.
    // This is defined to be a fixed length group
    static FixedLenGroup grp6 //(206 in FIG. 2C, this
                                    MANDATORY_FLD,
    vpciConnIdleParm_.Init (this);
    // Store the location and length vpci parameter
    // relative to the conn_id_struct into the prefExclConnIdleParm_
    // object.
    prefExclConnIdleParm_
            .InitUserStructInfo ( offsetof(conn_id_struct, vpci ),
                        sizeof(connidUserStruct.vpci ) );
    // Define the range of valid values for the VPCI
    static CheckRangeOfVals     vpciValidityCheck (this);
    vpciValidityCheck.DefineMinValue (0);
    vpciValidityCheck.DefineMaxValue (255);
    // The last two bytes in the Connection Id IE is the two byte VCI
    // parameter.
    static FixedLenGroup grp7 //(208 in FIG. 2C, this
                                    MANDATORY_FLD,
    vciConnIdleParm_.Init (this);
    // Store the location and length vci parameter
    // relative to the conn_id_struct into the prefExclConnIdleParm_
    // object.
    prefExclConnIdleParm_
            .InitUserStructInfo ( offsetof(conn_id_struct, vci ),
                        sizeof(connidUserStruct.vci ) );
    // Define the range of valid values for the VCI
    static CheckRangeOfVals     vciValidityCheck (this);
    vpciValidityCheck.DefineMinValue (32);
    vpciValidityCheck.DefineMaxValue (65535);
```

Execution of the above version of the constructor results in an object hierarchy depicted in FIG. 2C. An example showing a method of build, that is formatting a PDU or Connection Identifier IE 200 directly from an API data structure or conn_id_struct is illustrated and described with respect to FIGS. 14A and 14B.

Figure 2D:
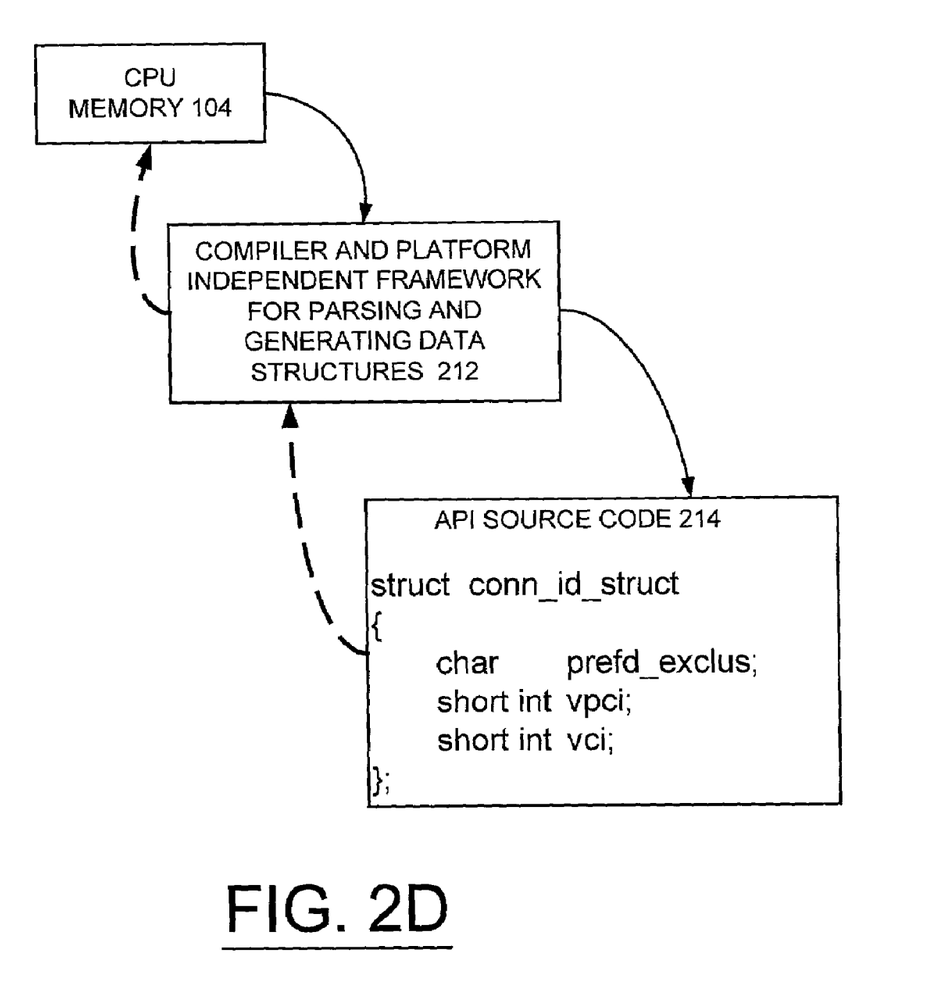
FIG. 2D is a block diagram illustrating a compiler and platform independent framework for parsing and generating data structures with exemplary source code structure and CPU memory in accordance with the preferred embodiment.

FIG. 2D illustrates an exemplary arrangement generally designated by the reference character 210 of a compiler and platform independent framework 212 for parsing and generating data structures in accordance with the preferred embodiment with exemplary source code 214 and CPU memory 104. As shown in FIG. 2, exemplary API source code 214 includes the following:

```
        struct conn_id_struct
        {
                char        prefd_exclus;
                short int   vpci;
                short int   vci;
        }
```

Figure 3:
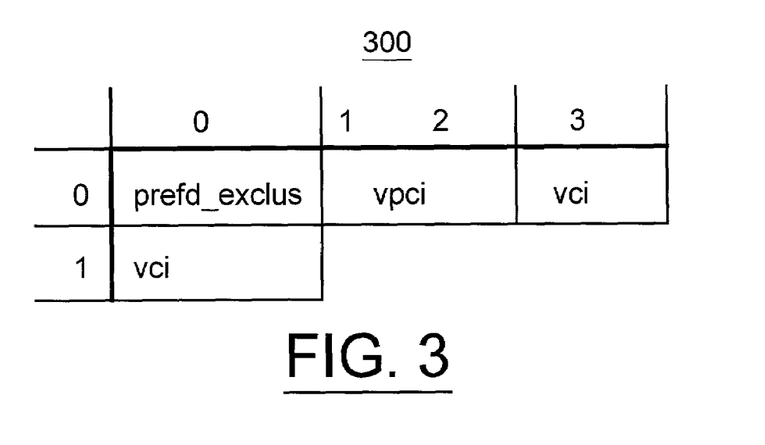
FIG. 3 is a diagram illustrating a memory view of a compiler generating packed data structures in accordance with the preferred embodiment.

FIG. 3 illustrates a memory view of a compiler generating packed data structures generally designated by the reference character 300 in accordance with the preferred embodiment.

Figure 4:
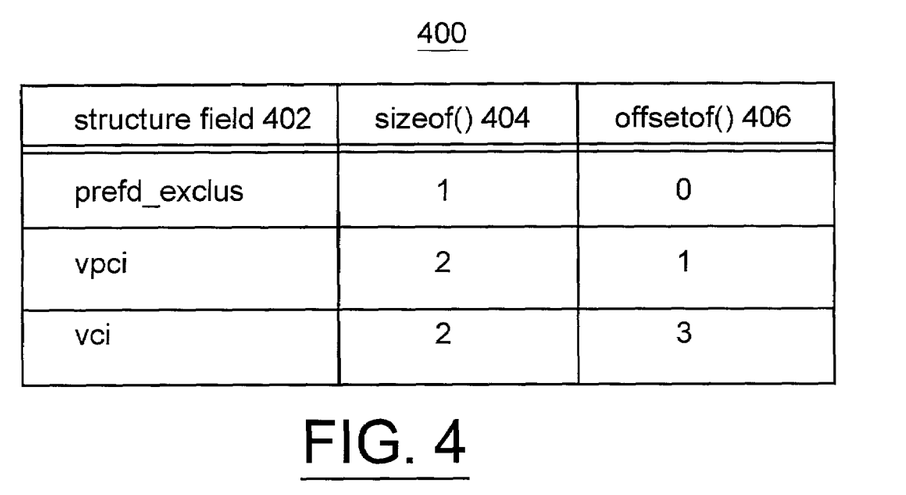
FIG. 4 is a diagram illustrating information to manipulate the data generated by the compiler for the packed data structures of FIG. 3 in accordance with the preferred embodiment.

FIG. 4 illustrates information generally designated by the reference character 400 to manipulate the data generated by the compiler for the packed data structures 300 in accordance with the preferred embodiment. As shown, structure field prefd_exclus has a sizeof( ) equal to 1 byte and an offsetof( ) equal to 0. Structure field vpci has a sizeof( ) equal to 2 bytes and an offsetof( ) equal to 1. Structure field vci has a sizeof( ) equal to 2 bytes and an offsetof( ) equal to 3.

Figure 5:
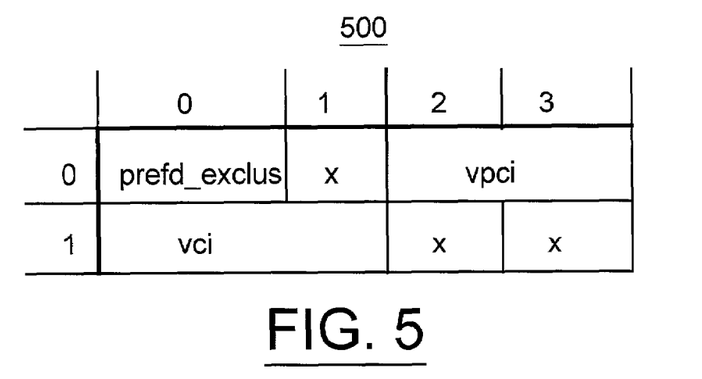
FIG. 5 is a diagram illustrating a memory view of a compiler generating data structures using 16-bit alignment in accordance with the preferred embodiment.

FIG. 5 illustrates a memory view of a compiler generating data structures using 16-bit alignment generally designated by the reference character 500 in accordance with the preferred embodiment. Data structure 500 includes wasted or not used memory indicated by x. Data structure 500 avoids split of vci over a split boundary.

Figure 6:
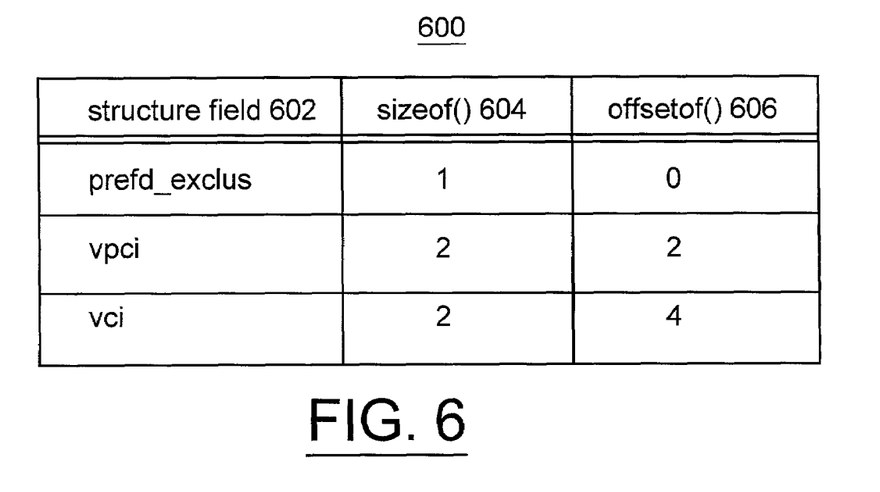
FIG. 6 is a diagram illustrating information to manipulate the data generated by the compiler for the data structures of FIG. 5 in accordance with the preferred embodiment.

FIG. 6 illustrates information generally designated by the reference character 600 to manipulate the data generated by the compiler for the packed data structures 500 in accordance with the preferred embodiment. As shown, structure field prefd_exclus has a sizeof( ) equal to 1 byte and an offsetof( ) equal to 0. Structure field vpci has a sizeof( ) equal to 2 bytes and an offsetof( ) equal to 2. Structure field vci has a sizeof( ) equal to 2 bytes and an offsetof( ) equal to 4.

Figure 7:
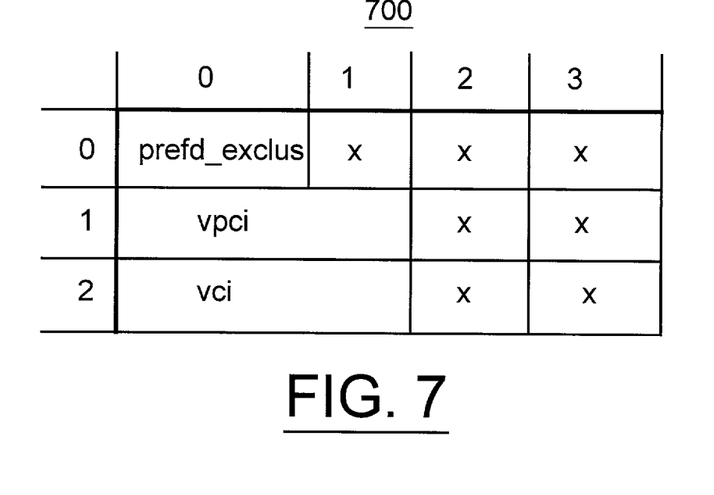
FIG. 7 is a diagram illustrating a memory view of a compiler generating data structures using 32-bit alignment in accordance with the preferred embodiment.

FIG. 7 illustrates a memory view of a compiler generating data structures using 32-bit alignment generally designated by the reference character 700 in accordance with the preferred embodiment. Data structure 700 is used where 4-byte memory read is most efficient and is set to 4-byte boundary. Data structure 700 includes wasted or not used memory indicated by x.

Figure 8:
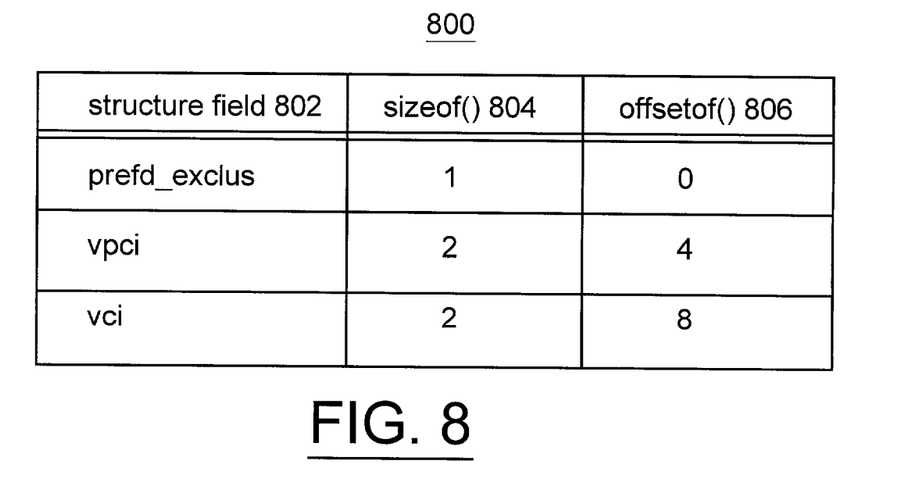
FIG. 8 is a diagram illustrating information to manipulate the data generated by the compiler for the data structures of FIG. 7 in accordance with the preferred embodiment.

FIG. 8 illustrates information generally designated by the reference character 800 to manipulate the data generated by the compiler for the packed data structures 700 in accordance with the preferred embodiment. As shown, structure field prefd_exclus has a sizeof( ) equal to 1 byte and an offsetof( ) equal to 0. Structure field vpci has a sizeof( ) equal to 2 bytes and an offsetof( ) equal to 4. Structure field vci has a sizeof( ) equal to 2 bytes and an offsetof( ) equal to 8.

Figure 9:
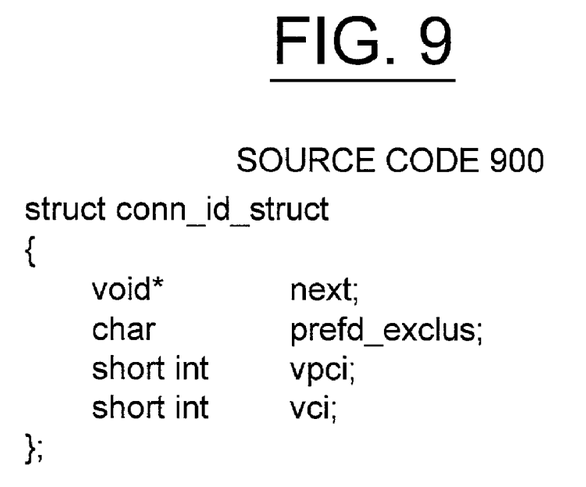
FIG. 9 is a diagram illustrating another exemplary source code structure in accordance with the preferred embodiment.

FIG. 9 illustrates another exemplary source code structure generally designated by the reference character 900 in accordance with the preferred embodiment. An advantage of the preferred embodiment is provided when the same source code is to be compiled for different platforms. Exemplary source code structure 900 is modified to contain a pointer field. As shown in FIG. 9, exemplary source code 900 includes the following:

```
struct conn_id_struct
{
    void*       next;
    char        prefd_exclus;
    short int   vpci;
    short int   vci;
}
```

Figure 10:
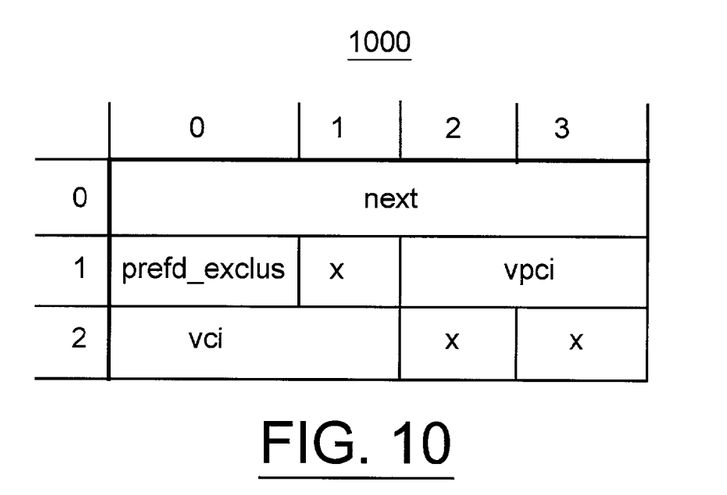
FIG. 10 is a diagram illustrating a memory view of a compiler generating aligned data structures for 32-bit CPU architecture in accordance with the preferred embodiment.

FIG. 10 illustrates a memory view of a compiler generating aligned data structures for 32-bit CPU architecture generally designated by the reference character 1000 for the exemplary source code 900 in accordance with the preferred embodiment. Wasted memory space in data structure 1000 is indicated by x.

Figure 11:
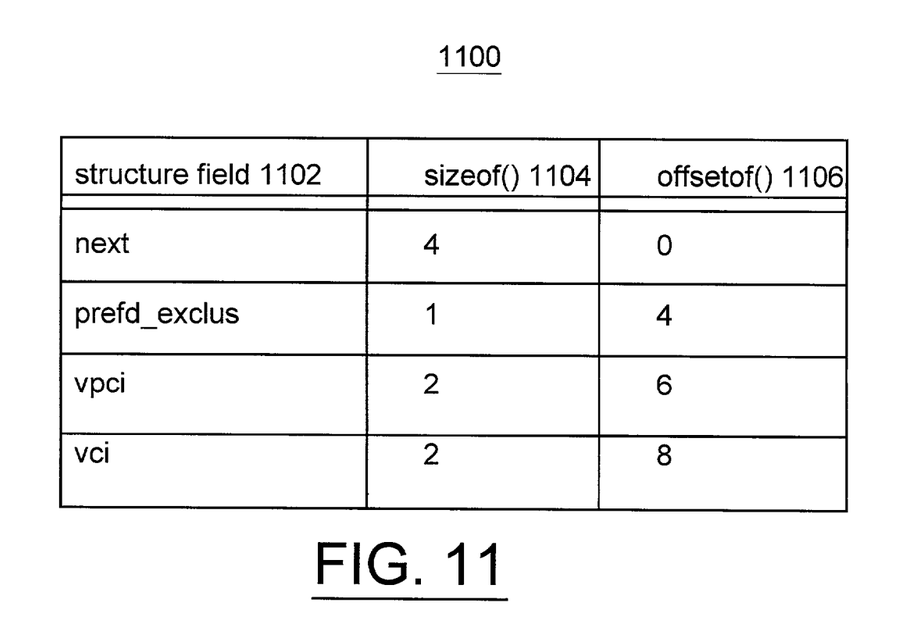
FIG. 11 is a diagram illustrating information to manipulate the data generated by the compiler for the aligned data structures of FIG. 10 in accordance with the preferred embodiment.

FIG. 11 illustrates information generally designated by the reference character 1100 to manipulate the data generated by the compiler for the aligned data structures 1000 in accordance with the preferred embodiment. As shown, structure field next has a sizeof( ) equal to 4 bytes and an offsetof( ) equal to 0. Structure field prefd_exclus has a sizeof( ) equal to 1 byte and an offsetof( ) equal to 4. Structure field vpci has a sizeof( ) equal to 2 bytes and an offsetof( ) equal to 6. Structure field vci has a sizeof( ) equal to 2 bytes and an offsetof( ) equal to 8.

FIG. 12 illustrates a memory view of a compiler generating aligned data structures for 64-bit CPU architecture generally designated by the reference character 1200 in accordance with the preferred embodiment.

FIG. 13 illustrates information generally designated by the reference character 1300 to manipulate the data generated by the compiler for the aligned data structures 1200 in accordance with the preferred embodiment. As shown, structure field next has a sizeof( ) equal to 8 bytes and an offsetof( ) equal to 0. Structure field prefd_exclus has a sizeof( ) equal to 1 byte and an offsetof( ) equal to 8. Structure field vpci has a sizeof( ) equal to 2 bytes and an offsetof( ) equal to 10. Structure field vci has a sizeof( ) equal to 2 bytes and an offsetof( ) equal to 12.

Referring now to FIGS. 14A and 14B, there are shown flow charts illustrating sequential steps for build of a PDU, such as connection identifier IE 200, directly from an API data structure in accordance with the preferred embodiment. As shown in this case, the API data structure is the conn_id_struct. Referring also to FIG. 2C, a header is built using the IE identifier as indicated in a block 1400. Next a first group rule is obtained as indicated in a block 1402. A first data rule in the group is obtained as indicated in a block 1404. Checking for a type of group is performed as indicated in a block 1406. When an extension bit group is identified, such as grp 5: Extension bit group 204, the PDU byte is set to an initial value, such as 0×08, as indicated in a block 1408. After the PDU byte is set to an initial value or when a fixed length group is identified, such as grp 6 fixed length group 206 or grp 7: fixed length group 208, then the first data rule is obtained as indicated in a block 1410. Checking for a type of data rule is performed as indicated in a decision block 1412. When two-byte data is identified for the data rule, then the data is read from the API structure using length and offset stored in this data rule as indicated in a block 1414. Also this data is written into the next two-bytes of the PDU and the PDU buffer pointers are advanced at block 1414. When sub-byte data is identified for the data rule, then the data is read from the API structure using length and offset stored in this data rule as indicated in a block 1416. This data is written into the bits defined by mask stored in this data rule and the PDU buffer pointers are advanced if this was the last data rule for this group at block 1416.

Then the sequential operations continue following entry point A in FIG. 14B to get the next data rule as indicated in a decision block 1418. Then the sequential operations continue following entry point B in FIG. 14A to identify the type of the group rule at decision block 1406. Otherwise, if the next data rule is null, then the next group rule is obtained as indicated in a decision block 1406. Then the sequential operations continue following entry point C in FIG. 14A to get the first data rule in the group rule at block 1404. Otherwise, if the next group rule is null, then the sequential operations end as indicated in a block 1422.

It should be understood that the compiler and platform independent framework for parsing and generating data structures 212 of the preferred embodiment is not limited to ATM call control or data communications. For example, the method for parsing and generating data structures of the preferred embodiment advantageously can be used with various applications, such as control of writing and reading data storage in disk, tape, or the like.

Figure 15:
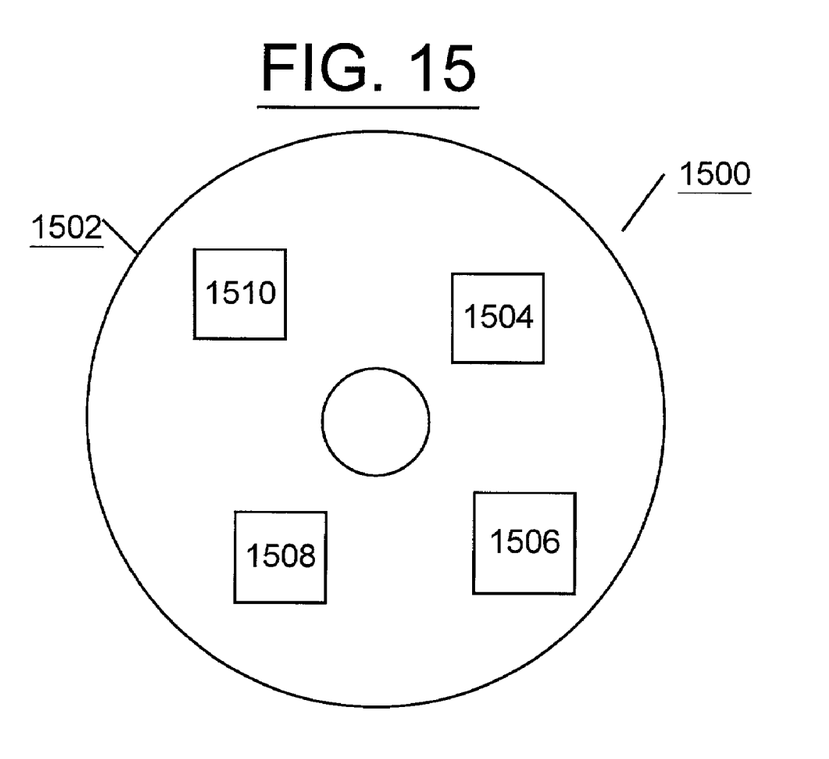
FIG. 15 is a block diagram illustrating a computer program product in accordance with the preferred embodiment.

Referring now to FIG. 15, an article of manufacture or a computer program product 1500 of the invention is illustrated. The computer program product 1500 includes a recording medium 1502, such as, a floppy disk, a high capacity read only memory in the form of an optically read compact disk or CD-ROM, a tape, a transmission type media such as a digital or analog communications link, or a similar computer program product. Recording medium 1502 stores program means 1504, 1506, 1508, 1510 on the medium 1502 for carrying out the methods for parsing and generating data structures of the preferred embodiment in the system 100 of FIG. 1.

A sequence of program instructions or a logical assembly of one or more interrelated modules defined by the recorded program means 1504, 1506, 1508,1510, direct the computer system 100 for parsing and generating data structures of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for parsing and generating data structures for use by data processing applications in a computer system comprising the steps of:
   utilizing sizeof and offsetof functions, defining a length and a location of each parameter of a data structure; and
   storing said defined length and said defined location of each said parameter of the data structure within an identifier object in a data structure definition used for parsing and generating data structures.

2. A method for parsing and generating data structures as recited in claim 1 wherein the data structure is an ATM information element (IE) and wherein the step of utilizing sizeof and offsetof functions, defining a length and a location of each parameter of a data structure includes the step of utilizing sizeof and offsetof functions, defining a length and a location of each data parameter of said ATM information element (IE).

3. A method for parsing and generating data structures as recited in claim 2 wherein said ATM information element (IE) is a Connection Identifier IE and wherein the step of utilizing sizeof and offsetof functions, defining a length and a location of each parameter of a data structure includes the step of utilizing sizeof and offsetof functions, defining a length and a location of each data parameter of said Connection Identifier IE.

4. A method for parsing and generating data structures as recited in claim 3 includes the step of utilizing sizeof and offsetof functions, defining a length and a location of a preferred/exclusive parameter.

5. A method for parsing and generating data structures as recited in claim 3 includes the step of utilizing sizeof and offsetof functions, defining a length and a location of a virtual path connection identifier (VPCI) parameter.

6. A method for parsing and generating data structures as recited in claim 3 includes the step of utilizing sizeof and offsetof functions, defining a length and a location of a virtual channel identifier (VOI) parameter.

7. A method for parsing and generating data structures as recited in claim 4 wherein the step of storing said length and said location of each said parameter of the data structure within an identifier object in a data structure definition includes the steps of storing said length and said location of said preferred/exclusive parameter in a preferred/exclusive parameter identifier object in said data structure definition.

8. A method for parsing and generating data structures as recited in claim 5 wherein the step of storing said length and said location of each said parameter of the data structure within an identifier object in a data structure definition includes the steps of storing said length and said location of said virtual path connection identifier (VPCI) parameter in a VPCI parameter identifier object in said data structure definition.

9. A method for parsing and generating data structures as recited in claim 6 wherein the step of storing said length and said location of each said parameter of the data structure within an identifier object in a data structure definition includes the steps of storing said length and said location of said virtual channel identifier (VCI) parameter in a VOI parameter identifier object in said data structure definition.

10. A compiler and platform independent framework for parsing and generating data structures used by data processing applications in a computer system comprising:
    means for defining a length and a location of each parameter of a data structure utilizing sizeof and offsetof functions; and
    means for storing said defined length and said defined location of each said parameter of the data structure within an identifier object in a data structure definition used for parsing and generating data structures.

11. A compiler and platform independent framework for parsing and generating data structures as recited in claim 10 is used by procedural table-driven or object rules-driven methods for parsing and generating data structures.

12. A compiler and platform independent framework for parsing and generating data structures as recited in claim 10 is used for parsing and generating of protocol data units (PDUs) in data communication messages.

13. A compiler and platform independent framework for parsing and generating data structures as recited in claim 10 is used for parsing and generating of control code for writing and reading headers for data storage.

14. A computer program product for parsing and generating data structures for use by data processing applications in a computer system, said computer system having a processor; a memory controller coupled to said processor by a system bus; a main memory coupled to said memory controller; said computer program product including a plurality of computer executable instructions stored on a computer readable medium, wherein said instructions, when executed by said computer system, cause said computer system to perform the steps of:
    utilizing sizeof and offsetof functions, defining a length and a location of each parameter of a data structure; and
    storing said defined length and said defined location of each said parameter of the data structure within an identifier object in a data structure definition used for parsing and generating data structures.

* * * * *